US012607555B2

(12) United States Patent
Takagi et al.

(10) Patent No.: US 12,607,555 B2
(45) Date of Patent: Apr. 21, 2026

(54) OPTICAL MEMBER AND GAS SENSOR

(71) Applicant: Asahi Kasei Microdevices Corporation, Tokyo (JP)

(72) Inventors: Yuta Takagi, Tokyo (JP); Kenta Furuta, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 172 days.

(21) Appl. No.: 18/602,024

(22) Filed: Mar. 12, 2024

(65) Prior Publication Data

US 2024/0319086 A1 Sep. 26, 2024

(30) Foreign Application Priority Data

Mar. 23, 2023 (JP) ................................. 2023-047289
Jan. 10, 2024 (JP) ................................. 2024-002138

(51) Int. Cl.
*G01N 21/00* (2006.01)
*G01N 21/3504* (2014.01)

(52) U.S. Cl.
CPC ............................... *G01N 21/3504* (2013.01)

(58) Field of Classification Search
CPC .................................................. G01N 21/3504
See application file for complete search history.

(56) References Cited

U.S. PATENT DOCUMENTS

| | | | |
|---|---|---|---|
| 2007/0035647 A1 | 2/2007 | Inuiya | |
| 2010/0301725 A1 | 12/2010 | Matsui et al. | |
| 2012/0235038 A1* | 9/2012 | Nishikawa ........... | G01N 21/359 |
| | | | 250/338.3 |
| 2013/0255870 A1 | 10/2013 | Wares et al. | |
| 2015/0303321 A1 | 10/2015 | Fukunaka et al. | |
| 2018/0080615 A1 | 3/2018 | Inoue et al. | |

FOREIGN PATENT DOCUMENTS

| | | |
|---|---|---|
| JP | 2003195136 A | 7/2003 |
| JP | 2007049458 A | 2/2007 |
| JP | 2016192295 A | 11/2016 |
| JP | 2017020901 A | 1/2017 |
| JP | 2023014052 A | 1/2023 |
| WO | 2009069741 A1 | 6/2009 |
| WO | 2014087619 A1 | 6/2014 |

\* cited by examiner

*Primary Examiner* — Dani Fox
(74) *Attorney, Agent, or Firm* — KENJA IP LAW PC

(57) ABSTRACT

An optical member (30) includes a reflective structure (32) including a metallic thin film or an optical thin film, a metal body electrically disconnected from the reflective structure (32), and a support (31) integrally sealing and supporting the reflective structure (32) and the metal body. The reflective structure (32) is exposed from a first surface of the support (31). The metal body is exposed from the support (31) on a second surface opposite the first surface from which the reflective structure (32) is exposed, and on at least one side different from the first surface and the second surface.

7 Claims, 13 Drawing Sheets

33 (33F)     30     33 (33E)

A                                           A'

32

31

33 (33A)     33 (33B)

32     30

31

OPTICAL MEMBER AND GAS SENSOR

CROSS-REFERENCE TO RELATED APPLICATIONS

The present application claims priority to Japanese Patent Application No. 2023-047289 filed on Mar. 23, 2023 and Japanese Patent Application No. 2024-002138 filed on Jan. 10, 2024, the entire contents of which are incorporated herein by reference.

TECHNICAL FIELD

The present disclosure relates to an optical member and a gas sensor.

BACKGROUND

Gas detection apparatuses (gas sensors) for detecting gases are used in various fields. For example, NDIR (Non-Dispersive InfraRed) gas sensors are used to measure the concentration of a gas by detecting the amount of absorbed infrared radiation, utilizing the fact that the wavelength of infrared radiation that is absorbed differs depending on the type of gas. In NDIR-type gas sensors, the gas to be detected is measured by detecting, with an infrared detector, light affected by the gas to be detected. For example, Patent Literature (PTL) 1 discloses an infrared detector that achieves a reduction in size by arranging the light-emitting surface of an optical filter to face the light-receiving surface of a light-receiving element.

CITATION LIST

Patent Literature

PTL 1: WO2014/087619

SUMMARY

A compact gas sensor can be achieved with use of the infrared detector of PTL 1. However, demand exists for a further reduction in size. The optical filter of PTL 1 transmits light so that the light reaches the light-receiving surface of the light-receiving element. Therefore, there is a limit to how thin an infrared detector that is packaged with an optical filter can be made. Although it is possible to use an optical filter that is separated from the infrared detector, such optical filters have conventionally presented mounting problems, such as the difficulty of arranging the optical filter in an appropriate position along the optical path.

It would be helpful to provide an optical member and a gas sensor that increase the degree of freedom of design and can achieve a compact measuring apparatus.

(1) An optical member according to an embodiment of the present disclosure includes:
a reflective structure including a metallic thin film or an optical thin film;
a metal body electrically disconnected from the reflective structure; and
a support integrally sealing and supporting the reflective structure and the metal body, wherein
the reflective structure is exposed from a first surface of the support.

(2) As an embodiment of the present disclosure, in (1), the metal body is exposed from the support on a second surface opposite the first surface from which the reflective structure is exposed, and on at least one side different from the first surface and the second surface.

(3) As an embodiment of the present disclosure, in (1) or (2), $(T \times S \times \rho)/0.6 \times 10^{-3} < L$, where T is a thickness in mm of the reflective structure, S is an exposed area in mm$^2$ of the reflective structure, $\rho$ is a density in g/mm$^3$ of a material of the reflective structure, and L is a total exposed length in mm of the metal body.

(4) As an embodiment of the present disclosure, in (2), the metal body includes a plurality of metal body exposed portions, and at least two of the metal body exposed portions are conducting.

(5) As an embodiment of the present disclosure, in (4), the metal body exposed portion is provided on each side of the second surface, and the metal body exposed portion has a different shape on at least two sides.

(6) As an embodiment of the present disclosure, in any one of (1) to (3), the metal body includes a plurality of metal body exposed portions, and the metal body exposed portions have at least two different sizes.

(7) A gas sensor according to an embodiment of the present disclosure includes the optical member of any one of (1) to (6), a light source, a detector, and a printed circuit board on which the optical member, the light source, and the detector are surface mounted.

According to the present disclosure, an optical member and a gas sensor that increase the degree of freedom of design and can achieve a compact measuring apparatus can be provided.

DETAILED DESCRIPTION

Figure 1:
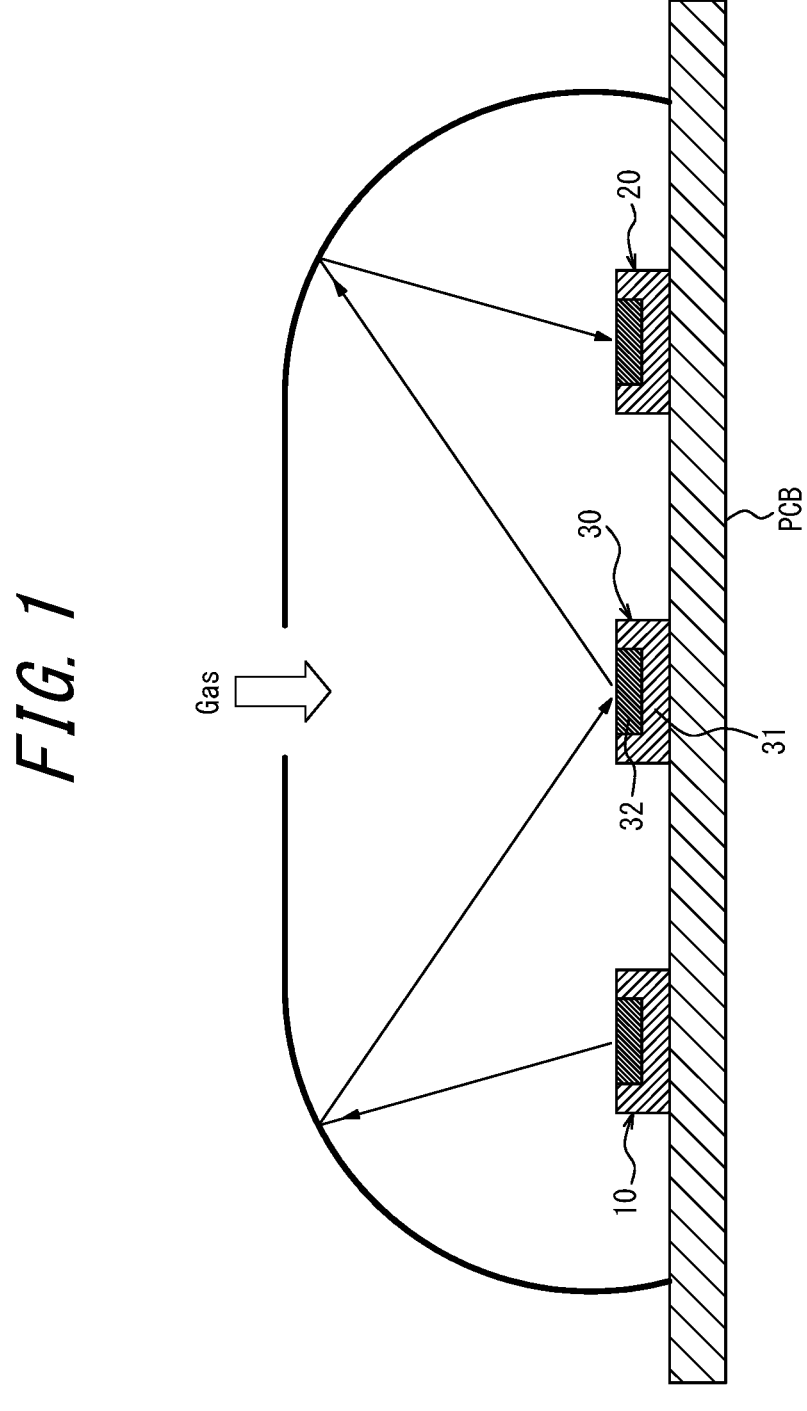
FIG. 1 is a diagram illustrating a configuration example of a gas detection apparatus (gas sensor) provided with an optical member according to an embodiment of the present disclosure.

An optical member and a gas sensor according to an embodiment of the present disclosure are described below with reference to the drawings. Parts in the drawings that are the same or correspond are allotted the same reference signs. In the description of the present embodiment, descriptions of parts that are the same or correspond may be omitted or abbreviated as appropriate.

FIG. 1 is a diagram illustrating a configuration example of a gas detection apparatus (gas sensor) provided with an optical member 30 according to the present embodiment. The optical member 30 is not limited to a specific measuring apparatus and may be used in various measuring apparatuses. An example of use in a gas detection apparatus is described in the present embodiment. A gas detection apparatus is an apparatus that measures the concentration of a gas to be detected within a gas. The gas detection apparatus in the example in FIG. 1 is an NDIR-type apparatus that measures the concentration of the gas to be detected based on infrared radiation transmitted through an introduced gas. The gas to be detected can, for example, be carbon dioxide, water vapor, carbon monoxide, nitrogen monoxide, ammonia, sulfur dioxide, alcohol, formaldehyde, methane, propane, or the like.

The gas detection apparatus includes a light source 10, a detector 20, and an optical member 30. FIG. 1 is a cross-sectional view of the gas detection apparatus at the portion including the light source 10, the detector 20, and the optical member 30. The optical member 30 is provided on the optical path by which light from the light source 10 reaches the detector 20. In other words, the optical member 30 forms part of the optical path. The gas detection apparatus is configured by surface mounting the light source 10, the detector 20, and the optical member 30 on a printed circuit board (PCB). The gas detection apparatus is also provided with a cover on the PCB so that a space for introducing gas is formed inside. A mirror may be formed on the inner surface of the cover to reflect light. The mirror is, for example, a concave mirror. The mirror may be made of a metal having a high reflectance, such as aluminum and gold. The gas detection apparatus may additionally be provided with a controller that controls at least one of the light source 10 and the detector 20. The controller may calculate the gas concentration based on the detection signal from the detector 20. The controller may be realized by a microcontroller (Micro Controller Unit) mounted on the PCB, for example. The controller may be realized by an Application Specific Integrated Circuit (ASIC).

The light source 10 emits light containing a wavelength that is absorbed by the gas to be measured. As specific examples, the light source 10 may be configured to include a Light Emitting Diode (LED) or Micro Electro Mechanical Systems (MEMS) light source. In the present embodiment, the light source 10 is an infrared LED.

The detector 20 is sensitive to a band of light that includes wavelengths absorbed by the gas being measured. As a specific example, the detector may be a quantum-type sensor, such as a photodiode with a PIN structure. In the present embodiment, the detector 20 is a quantum-type infrared detector.

Figure 2A:
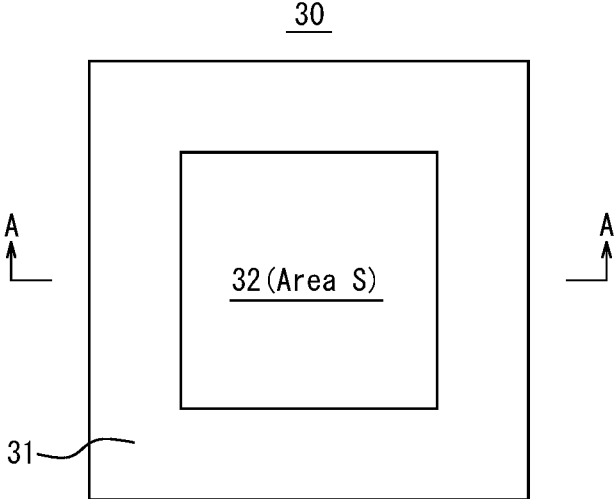
FIG. 2A is a top view of an example configuration of an optical member.
Figure 2B:
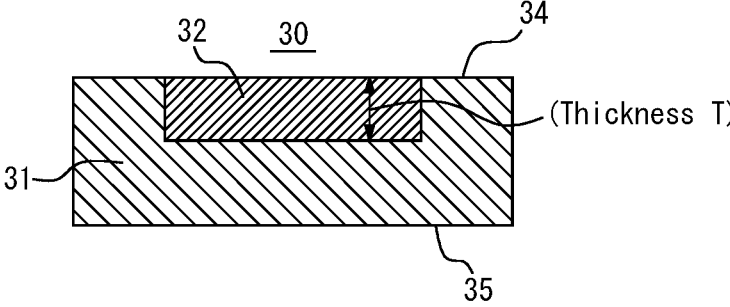
FIG. 2B is an A-A' cross-sectional view of the optical member in FIG. 2A.
Figure 2C:
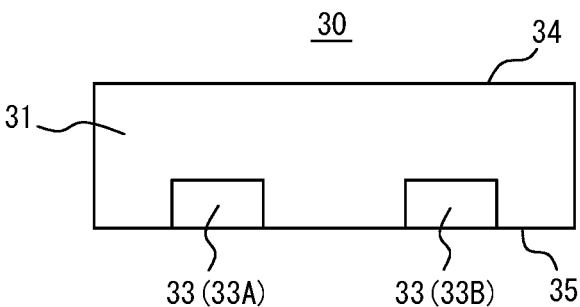
FIG. 2C is a side view of the optical member in FIG. 2A.
Figure 2D:
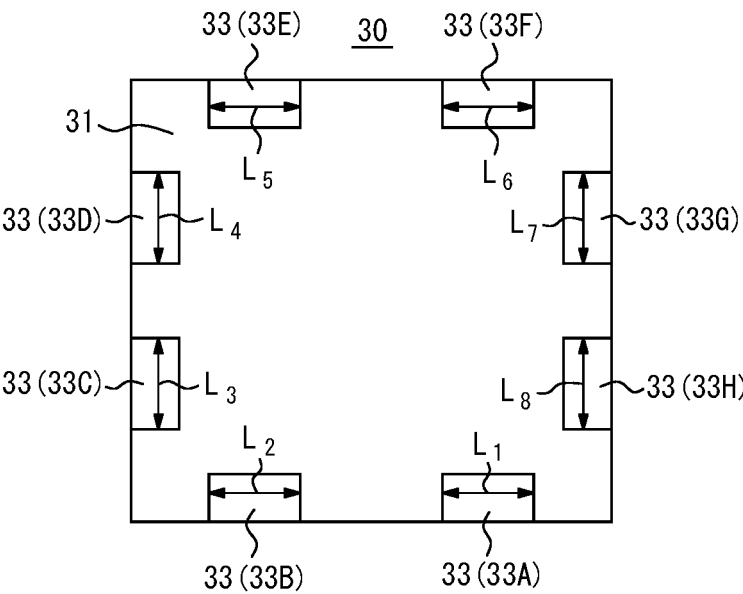
FIG. 2D is a bottom view of the optical member in FIG. 2A.

FIG. 2A is a top view of the optical member 30. FIG. 2B is an A-A' cross-sectional view of the optical member 30 in FIG. 2A. FIG. 2C is a side view of the optical member 30 in FIG. 2A. FIG. 2D is a bottom view of the optical member 30 in FIG. 2A. The optical member 30 includes a support 31, a reflective structure 32, and a metal body 33.

The reflective structure 32 includes a metallic thin film or an optical thin film. In greater detail, the reflective structure 32 is a structure in which the base material (base) is a semiconductor substrate (such as Si) and has a metallic thin film or optical thin film formed on the surface of the base material. The reflective structure 32 may itself be metal. In a case in which the reflective structure 32 contains metal, the optical member 30 can reflect light and function as a mirror, for example. The metallic thin film may be configured by a metal having high reflectance, such as aluminum and gold, but is not limited to any particular metal. In a case in which the reflective structure 32 is an optical thin film, the optical member 30 can selectively reflect light of a specific wavelength and functions as a reflective optical filter, for example. The optical thin film may be configured by a combination of a dielectric film and a metal film, for example, but is not limited to any particular film configuration. For example, the material of the reflective structure 32 may be Si. The reflective structure 32 is exposed from a first surface 34 of the support 31.

The support 31 integrally seals and supports the reflective structure 32 and the metal body 33. The support 31 is formed to enclose at least a portion of the reflective structure 32. In the present embodiment, the reflective structure 32 is partially exposed, and the support 31 is formed to surround the reflective structure 32 except for the exposed portion. The support 31 may be configured by a resin including epoxy resin or polyphthalamide resin, for example, but is not limited to a specific type of resin.

The metal body 33 is exposed from the support 31 on a surface where the reflective structure 32 is not exposed. The metal body 33 is electrically disconnected from the reflective structure 32. The metal body 33 is soldered in the same manner as the electrodes of the light source 10 and the detector 20, and the optical member 30 is mounted on the PCB. The metal body 33 may be configured to include Cu, for example, but is not limited to any particular metal material. At least some of the portion of the metal body 33 exposed from the support 31 may, for example, be plated with Sn or the like.

As described above, there is a limit to thinness when the detector 20 is packaged by inclusion in an optical filter. The optical member 30 according to the present embodiment includes an optical filter or a high reflection film (high reflection mirror) as the reflective structure 32 and is arranged on the optical path. Therefore, by use of the optical member 30, the optical filter can be separated from the detector 20, for example, and the detector 20 can be made even thinner. The optical member 30 according to the present embodiment includes metal body exposed portions 33A to 33H, at which the metal body 33 is exposed, and can be reflowed or soldered in the same manner as the light source 10 and the detector 20. This increases the degree of freedom in the design of the gas detection apparatus and can make components thinner as described above, thus achieving a compact gas detection apparatus. A configuration can also be adopted in the reflective structure 32 to reflect light multiple times. In this case, wavelength selectivity can be improved by separating the optical filter from the detector 20 and designing an appropriate optical path with the reflective structure 32 as the optical filter.

The optical member 30 illustrated in FIGS. 2A to 2D has a second surface 35 opposite the first surface 34 at which the reflective structure 32 is exposed, and the second surface 35 is covered by the support 31 except for the exposed metal body 33. In other words, the metal body 33 is exposed from the support 31 at a portion of the second surface 35. FIG. 2D is a view of the second surface 35 from the front, and the portion except for the eight metal body exposed portions 33A to 33H is the support 31. As described above, the metal body 33 is exposed on a surface other than the first surface 34. The surfaces at which the metal body 33 is exposed may include the second surface 35 and at least one side. The sides are surfaces other than the first surface 34 and the second surface 35. For example, as illustrated in FIG. 2C, two metal body exposed portions 33A and 33B may be exposed on one side.

Here, it has generally been difficult to arrange the optical member 30, such as an optical filter, at an appropriate position along the optical path during mounting, thus making necessary a manufacturing process associated with arrangement. The optical member 30 according to the present embodiment is configured to easily yield a self-alignment effect by satisfying the relational expression described below and can be appropriately arranged on a printed circuit board by a solder reflow process similar to general electronic component mounting. The self-alignment effect refers to a phenomenon by which a mounted component that may be misaligned automatically moves to the correct position during reflow based on the surface tension of the solder during melting. The surface tension of solder during melting varies with, for example, the composition of the solder, the melting temperature of the solder, and the amount of flux. From experience, the surface tension of general eutectic solder and lead-free solder at the time of melting is approximately $0.35 \times 10^{-3}$ [N/mm] to $0.6 \times 10^{-3}$ [N/mm].

As illustrated in FIG. 2B, "T" is the thickness of the reflective structure 32. As illustrated in FIG. 2A, "S" is the exposed area of the reflective structure 32 at the first surface 34. "$\rho$" is the density of the material of the reflective structure 32. For example, in a case in which the base material of the reflective structure 32 is Si, $\rho$ is $2.3 \times 10^{-3}$ [g/mm$^3$]. "$\alpha$" is the surface tension of the solder during melting and is, for example, $0.6 \times 10^{-3}$ [N/mm]. Another value that may be used as an example of "$\alpha$" is $0.35 \times 10^{-3}$ [N/mm]. "L" is the total exposed length of the metal body 33 and is expressed as the sum of $L_1$ to $L_8$ in the example in FIG. 2D. Here, by setting L (the total exposed length of the metal body 33) so that "$(T \times S \times \rho)/\alpha < L$" (hereinafter, Equation 1) holds, a configuration that easily yields a self-alignment effect can be adopted. For example, if the thickness (T) of the reflective structure 32 is 0.55 [mm], the exposed area (S) is 1 [mm$^2$], and $\rho$ and $\alpha$ are as in the example above, then it suffices for the total exposed length (L) of the metal body 33 to be set larger than 2.11 [mm]. By the aforementioned relational expression being satisfied, a self-alignment effect is easily generated in the optical member 30, enabling arrangement at an appropriate position during mounting. Here, as long as a sufficiently great self-alignment effect is yielded, it is tolerable if the relationship in Equation 1 is not satisfied.

Here, the fact that the optical member 30 has the same shape as the light source 10 and the detector 20 and can be reflowed or the like increases the degree of freedom in design but also increases the risk of mistaking the optical member 30 for the light source 10 or the detector 20. In addition, in the case of a plurality of types of optical members 30, such as an optical filter for one wavelength band and an optical filter for another wavelength band, it is necessary to distinguish between the optical members 30. It is generally difficult to distinguish by appearance, based on visible light, among types of infrared light optical filters used in NDIR gas sensors. Therefore, the optical member 30 may have a plurality of metal exposed portions 33A to 33H, and at least two of the metal exposed portions 33A to 33H may be conducting. This makes it easier to distinguish between the light source 10 and the detector 20. The type of optical member 30 may also be identified by a combination of conducting metal body exposed portions 33A to 33H. An optical member 30 in which the metal body exposed portion 33A and the metal body exposed portion 33B, for example, are conducting may be an optical filter of one wavelength band, and an optical member 30 in which the metal body exposed portion 33B and the metal body exposed portion 33C, for example, are conducting may be an optical filter of another wavelength band.

Here, along with or instead of distinguishing the metal body exposed portions 33A to 33H by conduction, the metal body exposed portions 33A to 33H may be distinguished by features based on appearance. The features based on appearance refer, for example, to provision of a plurality of metal body exposed portions 33A to 33H, with the metal body exposed portions 33A to 33H having at least two different sizes. Some examples of features based on appearance of the metal body exposed portions 33A to 33H are described below.

Figure 3A:
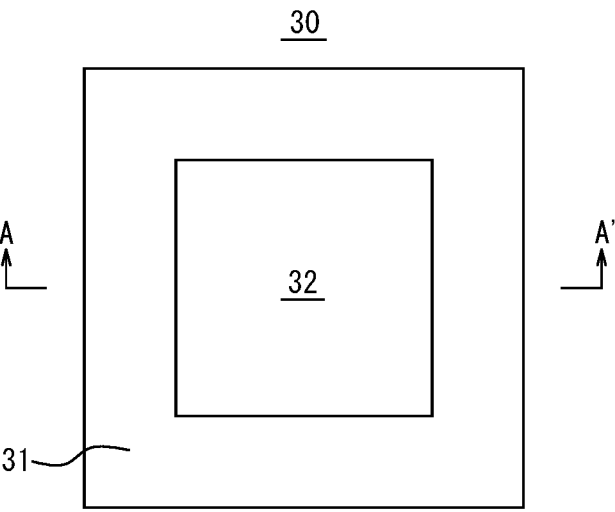
FIG. 3A is a top view of another example configuration of an optical member.
Figure 3B:
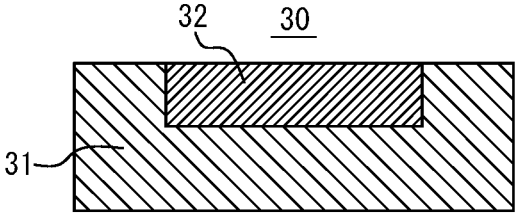
FIG. 3B is an A-A' cross-sectional view of the optical member in FIG. 3A.
Figure 3C:
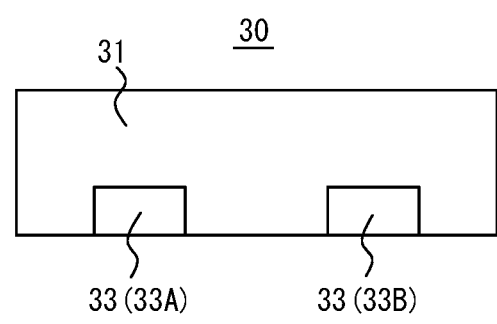
FIG. 3C is a side view of the optical member in FIG. 3A.
Figure 3C:
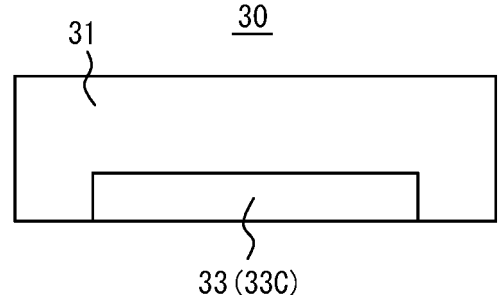
Figure 3D:
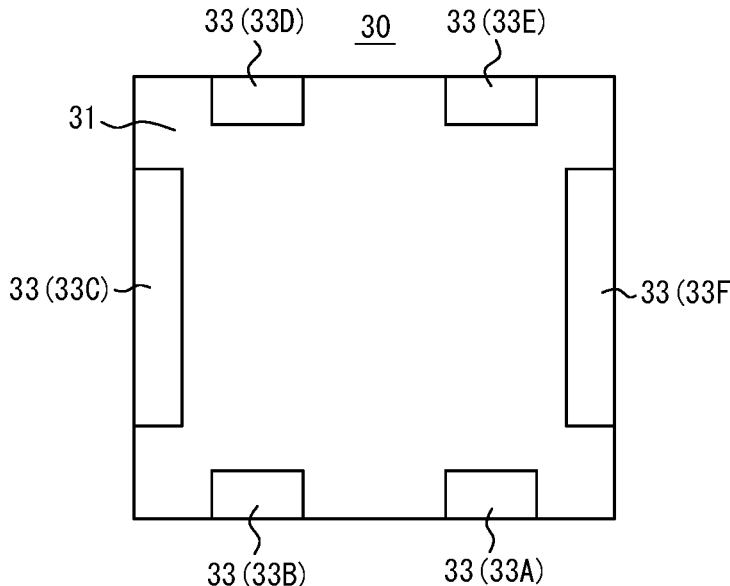
FIG. 3D is a bottom view of the optical member in FIG. 3A.

FIG. 3A is a top view of another example configuration of the optical member 30. FIG. 3B is an A-A' cross-sectional view of the optical member 30 in FIG. 3A. FIG. 3C is a side view of the optical member 30 in FIG. 3A. FIG. 3D is a bottom view of the optical member 30 in FIG. 3A. The optical member 30 may have metal body exposed portions 33A to 33F on each side on the second surface 35, and metal body exposed portions 33C and 33F with different shapes may be provided on at least two sides. In the example in FIG. 3D, the metal body exposed portions 33C and 33F are greater in length than the other metal body exposed portions 33A, 33B, 33D, and 33E and are provided on two opposing sides. Such features based on appearance make it even easier to distinguish between the light source 10 and the detector 20 and to identify the type of optical member 30.

Figure 4A:
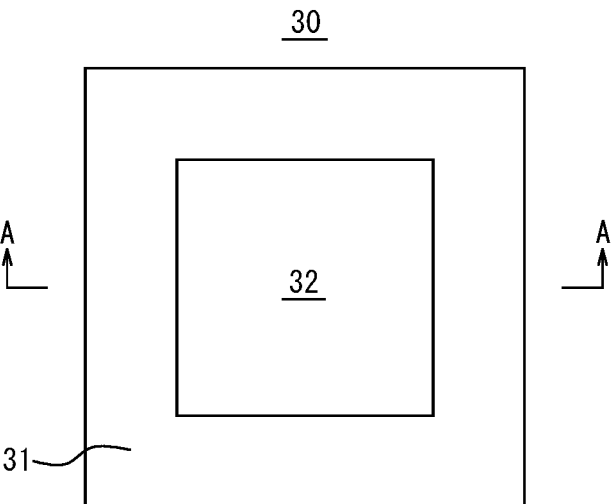
FIG. 4A is a top view of another example configuration of an optical member.
Figure 4B:
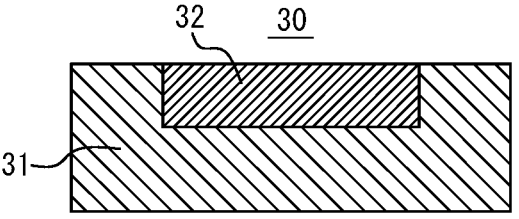
FIG. 4B is an A-A' cross-sectional view of the optical member in FIG. 4A.
Figure 4C:
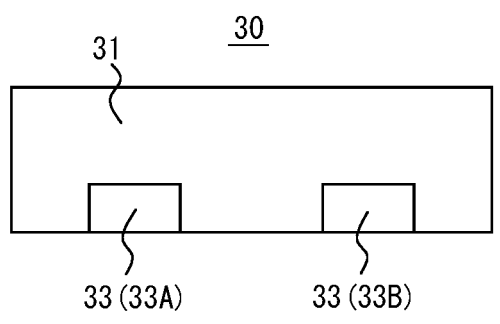
FIG. 4C is a side view of the optical member in FIG. 4A.
Figure 4C:
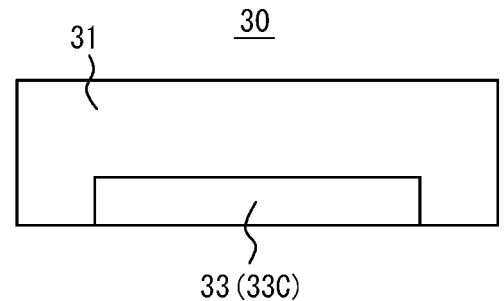
Figure 4D:
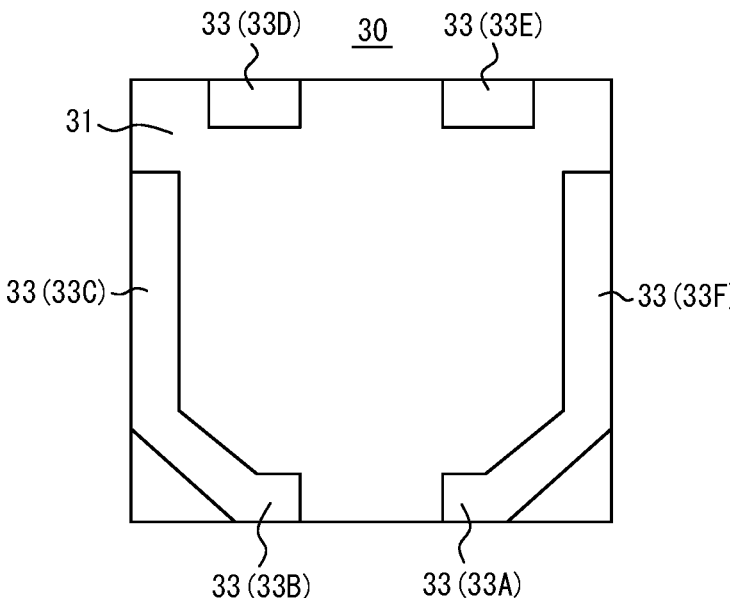
FIG. 4D is a bottom view of the optical member in FIG. 4A.

FIG. 4A is a top view of another example configuration of the optical member 30. FIG. 4B is an A-A' cross-sectional view of the optical member 30 in FIG. 4A. FIG. 4C is a side view of the optical member 30 in FIG. 4A. FIG. 4D is a bottom view of the optical member 30 in FIG. 4A. Metal body exposed portions 33C and 33F with different shapes may be provided on the second surface 35 of the optical member 30 so as to be connected to metal body exposed portions 33A and 33B each on one adjacent side. In the example in FIG. 4D, the metal body exposed portions 33C and 33F are connected to the metal body exposed portions 33B and 33A, respectively, are provided on two opposite sides, and have completely different shapes from the metal body exposed portions 33D and 33E. Such features based on appearance make it even easier to distinguish between the light source 10 and the detector 20 and to identify the type of optical member 30.

Figure 5A:
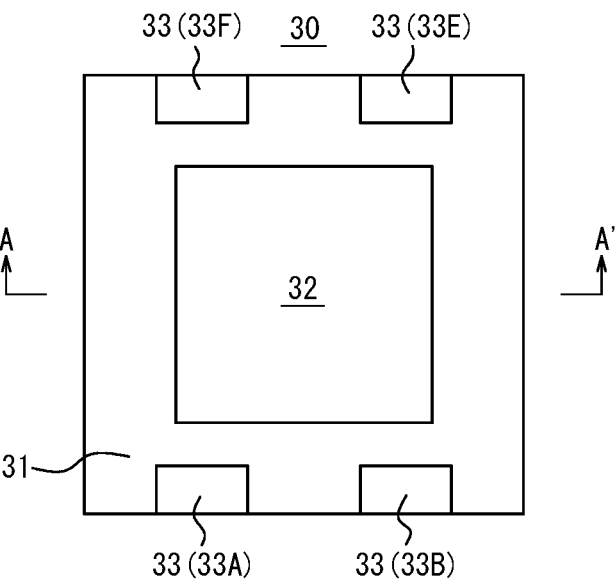
FIG. 5A is a top view of another example configuration of an optical member.
Figure 5B:
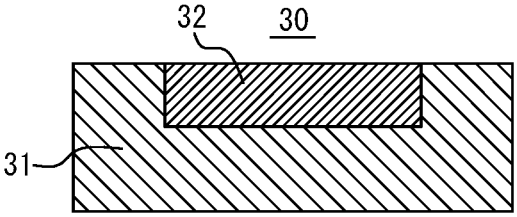
FIG. 5B is an A-A' cross-sectional view of the optical member in FIG. 5A.
Figure 5C:
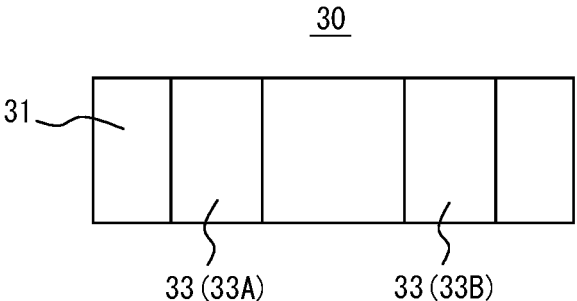
FIG. 5C is a side view of the optical member in FIG. 5A.
Figure 5D:
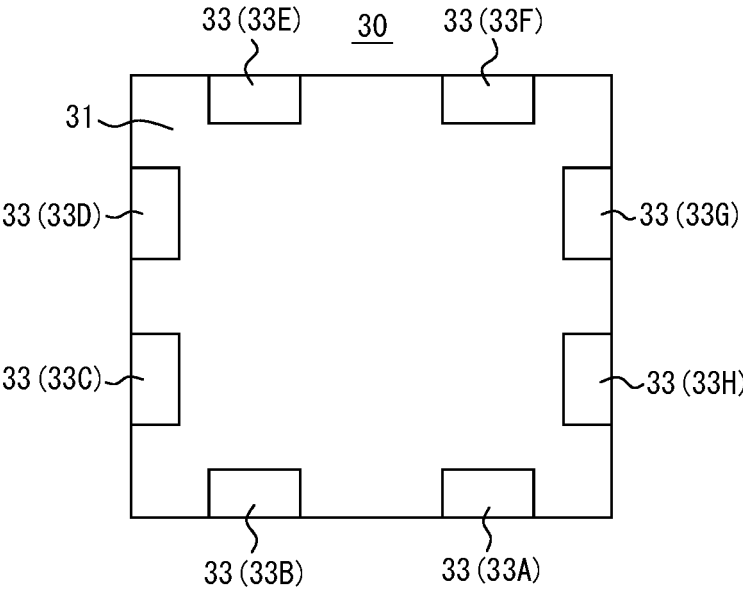
FIG. 5D is a bottom view of the optical member in FIG. 5A.

FIG. 5A is a top view of another example configuration of the optical member 30. FIG. 5B is an A-A' cross-sectional view of the optical member 30 in FIG. 5A. FIG. 5C is a side view of the optical member 30 in FIG. 5A. FIG. 5D is a bottom view of the optical member 30 in FIG. 5A. As illustrated in FIG. 5A, at least a portion of the metal body 33 may be exposed at the first surface 34 as well as at the second surface 35 in the optical member 30. As illustrated in FIG. 5C, the metal body 33 may also be exposed on the sides. Such features based on appearance make it even easier to distinguish between the light source 10 and the detector 20 and to identify the type of optical member 30.

Figure 6A:
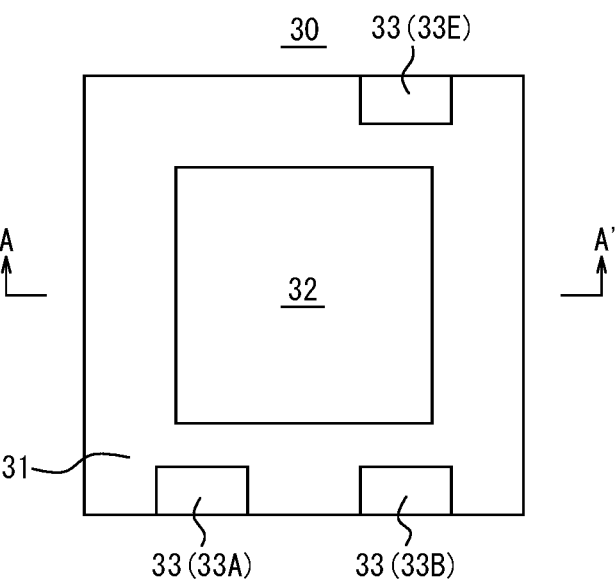
FIG. 6A is a top view of another example configuration of an optical member.
Figure 6B:
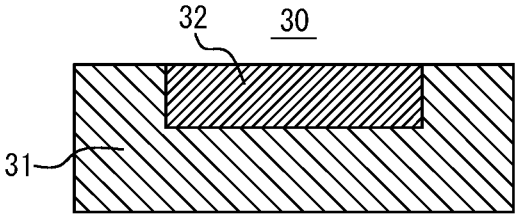
FIG. 6B is an A-A' cross-sectional view of the optical member in FIG. 6A.
Figure 6C:
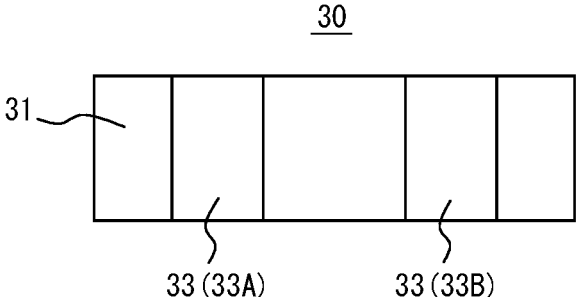
FIG. 6C is a side view of the optical member in FIG. 6A.
Figure 6D:
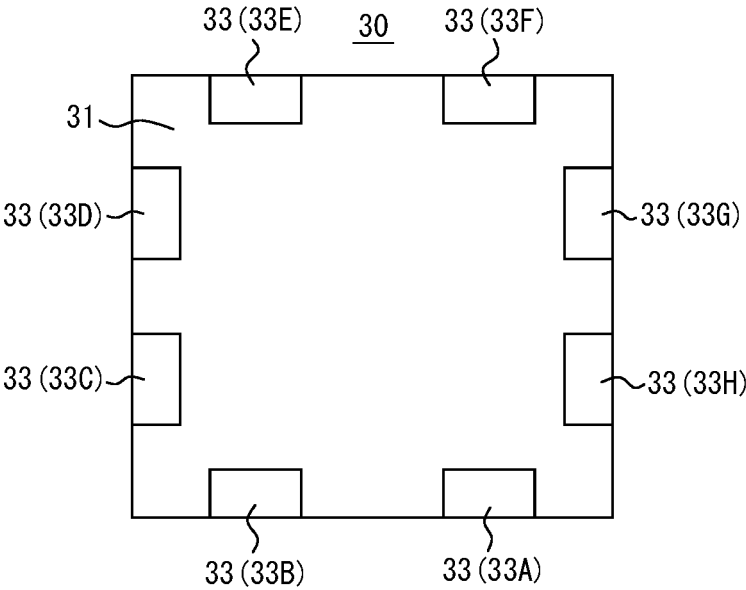
FIG. 6D is a bottom view of the optical member in FIG. 6A.

FIG. 6A is a top view of another example configuration of the optical member 30. FIG. 6B is an A-A' cross-sectional view of the optical member 30 in FIG. 6A. FIG. 6C is a side view of the optical member 30 in FIG. 6A. FIG. 6D is a bottom view of the optical member 30 in FIG. 6A. As illustrated in FIG. 6A, at least a portion of the metal body 33 may be exposed at the first surface 34 as well as at the second surface 35 in the optical member 30. In this case, unlike FIG. 5A, the metal body 33 may be exposed in a partially non-symmetrical manner. In the example in FIG. 6A, the metal body exposed portion 33E is exposed at the first surface 34, but the metal body exposed portion 33F is not exposed at the first surface 34. Such features based on appearance make it even easier to distinguish between light source 10 and the detector 20 and to identify the type of optical member 30.

Figure 7A:
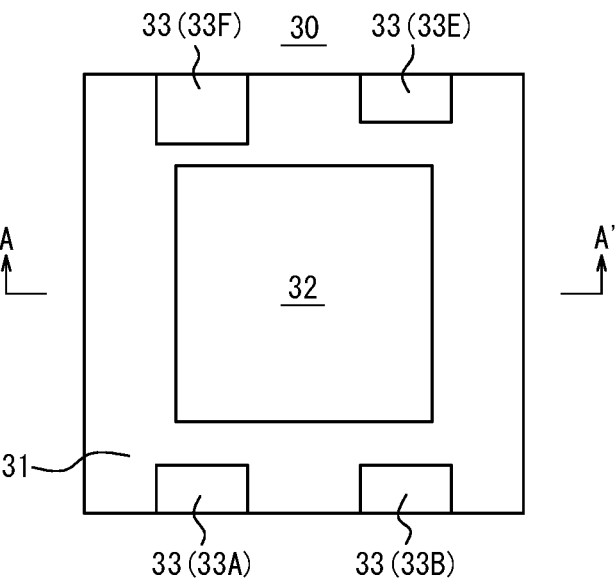
FIG. 7A is a top view of another example configuration of an optical member.
Figure 7B:
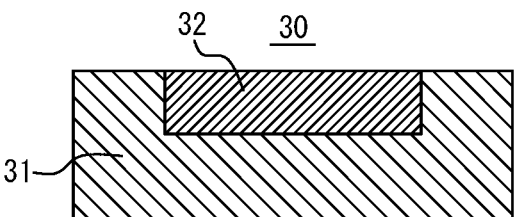
FIG. 7B is an A-A' cross-sectional view of the optical member in FIG. 7A.
Figure 7C:
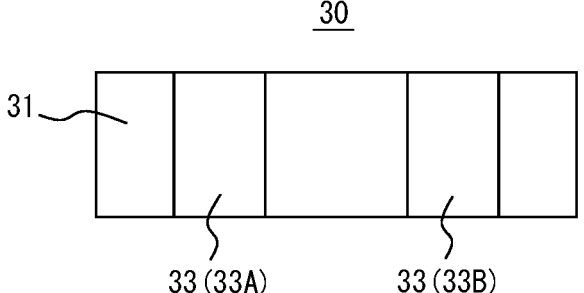
FIG. 7C is a side view of the optical member in FIG. 7A.
Figure 7D:
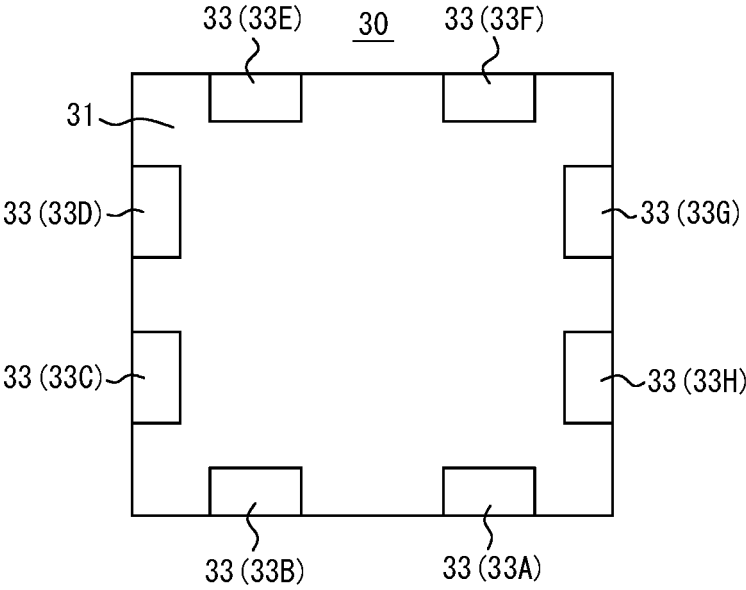
FIG. 7D is a bottom view of the optical member in FIG. 7A.

FIG. 7A is a top view of another example configuration of the optical member 30. FIG. 7B is an A-A' cross-sectional view of the optical member 30 in FIG. 7A. FIG. 7C is a side view of the optical member 30 in FIG. 7A. FIG. 7D is a bottom view of the optical member 30 in FIG. 7A. As illustrated in FIG. 7A, at least a portion of the metal body 33 may be exposed at the first surface 34 as well as at the second surface 35 in the optical member 30. In this case, unlike FIG. 5A, the metal body 33 may be exposed in a partially non-symmetrical manner. In the example in FIG. 7A, the metal body exposed portions 33E and 33F are exposed at the first surface 34, but the exposed area of the metal body exposed portion 33F is larger than the exposed area of the metal body exposed portion 33E. Such features based on appearance make it even easier to distinguish between the light source 10 and the detector 20 and to identify the type of optical member 30.

As described above, the optical member 30 and the gas sensor according to the present embodiment allow a greater degree of freedom in design and make it possible to achieve a compact measuring apparatus through the aforementioned configuration.

Although an embodiment of the present disclosure has been described based on the various drawings and examples, it should be noted that a person of ordinary skill in the art could easily make various modifications and revisions based on the present disclosure. Accordingly, such modifications and revisions should also be considered to be included within the scope of the present disclosure. For example, functions and the like included in various constituent parts, etc., may be rearranged so long as they are logically consistent. Moreover, a plurality of constituent parts, etc., may be combined as a single part or may be split up.

The invention claimed is:

1. An optical member comprising:
a reflective structure including a metallic thin film or an optical thin film;
a metal body electrically disconnected from the reflective structure; and
a support integrally sealing and supporting the reflective structure and the metal body, wherein
the reflective structure is exposed from a first surface of the support, and
the optical member is surface mounted on a printed circuit board.

2. The optical member according to claim 1, wherein the metal body is exposed from the support on a second surface opposite the first surface from which the reflective structure is exposed, and on at least one side different from the first surface and the second surface.

3. The optical member according to claim 1, wherein $(T \times S \times \rho)/0.6 \times 10^{-3} < L$, where T is a thickness in mm of the reflective structure, S is an exposed area in $mm^2$ of the reflective structure, $\rho$ is a density in $g/mm^3$ of a material of the reflective structure, and L is a total exposed length in mm of the metal body.

4. The optical member according to claim 2, wherein the metal body includes a plurality of metal body exposed portions, and at least two of the metal body exposed portions are conducting.

5. The optical member according to claim 4, wherein the metal body exposed portion is provided on each side of the second surface, and the metal body exposed portion has a different shape on at least two sides.

6. The optical member according to claim 1, wherein the metal body includes a plurality of metal body exposed portions, and the metal body exposed portions have at least two different sizes.

7. A gas sensor comprising the optical member according to claim 1, a light source, a detector, and the printed circuit board on which the optical member, the light source, and the detector are surface mounted.

\* \* \* \* \*